United States Patent

Sugimori et al.

[11] Patent Number: 5,830,976
[45] Date of Patent: Nov. 3, 1998

[54] POLYIMIDE

[75] Inventors: Shigeru Sugimori, Tokyo; Takashi Katoh, Kanagawa, both of Japan

[73] Assignee: Chisso Corporation, Osaka, Japan

[21] Appl. No.: 906,101

[22] Filed: Aug. 5, 1997

Related U.S. Application Data

[62] Division of Ser. No. 546,090, Oct. 20, 1995, Pat. No. 5,693,379.

[30] Foreign Application Priority Data

Oct. 20, 1994  [JP]  Japan .................................. 6-281255
Nov. 16, 1994  [JP]  Japan .................................. 6-306907

[51] Int. Cl.$^6$ ............................. C08G 75/00; C09K 19/00
[52] U.S. Cl. ............................. 528/172; 528/170; 428/1; 560/19; 560/50
[58] Field of Search .................................. 528/170, 172; 428/1; 560/19, 50

[56] References Cited

U.S. PATENT DOCUMENTS 4,874,834 10/1989 Higashi et al. .
4,876,330 10/1989 Higashi et al. .

FOREIGN PATENT DOCUMENTS 3179322  8/1991  Japan .
3179323  8/1991  Japan .
4100020  4/1992  Japan .
5-27244  2/1993  Japan .

*Primary Examiner*—Helen L. Pezzuto
*Attorney, Agent, or Firm*—Leydig, Voit & Mayer

[57] ABSTRACT

A polyamic acid is herein disclosed which contains a structural unit represented by the formula [2a]

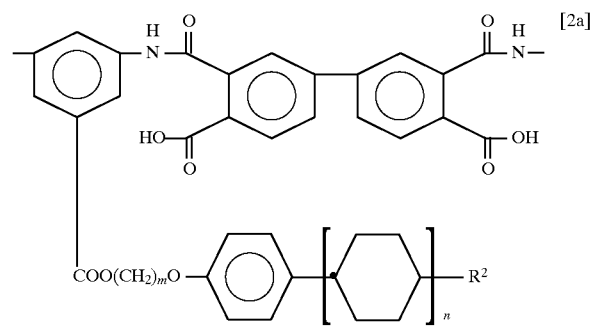

wherein m is an integer of 1 to 20; n is an integer of 1 to 2; and $R^2$ is an alkyl group or an alkoxy group having 1 to 20 carbon atoms. Furthermore, a polyamic acid composition is also disclosed which comprises the polyamic acid containing the structural unit represented by the formula [2a] and another polyamic acid containing a structural unit other than mentioned above. By heating the polyamic acid or the polyamic acid composition at a low temperature for a short time, a liquid crystal alignment film can be obtained which comprises a polyimide or a polyimide composition.

10 Claims, 3 Drawing Sheets

POLIMIDE

This disclosure is a division of patent application Ser. No. 08/546,090, filed Oct. 20, 1995, now U.S. Pat. No. 5,693,379.

BACKGROUND OF THE INVENTION (i) Field of the Invention

The present invention relates to a polyamic acid, a polyimide, a polyamic acid composition, a polyimide composition and a liquid crystal alignment film having a side chain containing a liquid crystal formation factor such as a phenylcyclohexyl group or a phenylbicyclohexyl group, i.e., a mesogen group.

(ii) Description of the Related Art

Polyimides are good plastics having the highest heat resistance of commercially available plastics. They also are excellent in impact resistance, dimensional stability, electrical properties and wear resistance and scarcely change their characteristics with temperature. By the utilization of such features, the polyimides have been used as insulating materials, sealing materials, print substrates in electrical and electronic fields, materials for aerospace and materials for machines. In recent years, much attention has been paid to the polyimides as materials for alignment films of liquid crystal displays, and many kinds of polyimide alignment films have been developed.

In each of the liquid crystal displays which have been used in watches and electronic calculators, a twisted nematic (hereinafter abbreviated to "TN") mode in which an orientating direction of a nematic liquid crystal molecule is twisted 90° is mainly employed between a pair of upper and lower electrode substrates. Furthermore, a super-twisted nematic (hereinafter abbreviated to "STN") mode in which the twist angle of the liquid crystal is in the range of 180° to 270° has also been prevalent of late, and liquid crystal displays having the STN mode have been mass-produced as large displays for word processors, personal computers and the like. In alignment films which can be used in these liquid crystal displays, mere alignment of the liquid crystal molecules is insufficient, and in order to improve responsibility and to secure bistability, a pretilt angle of 1° to 4° in terms of the TN mode or 4° to 8° in terms of the STN mode must be taken between a substrate surface and the liquid crystal molecule. Nowadays, for displays having excellent contrast and visual dependence, a super-twisted birefringence effect (hereinafter abbreviated to "SBE") mode has been developed, and in this mode, a high pretilt angle of 20° to 30° is required.

The demand of the color liquid crystal displays increases, but one of the color display systems which have now widely been used is a color filter system, and the utilization of this system has spread to liquid crystal color televisions and displays for personal computers. This system is a system in which a color filter is interposed between a substrate and transparent electrodes. In this system, the substrate provided with the transparent electrodes and the color filter is coated with a polyamic acid, followed by drying and baking, to form a polyimide film, but the dye type color filter is relatively poor in heat resistance, and hence the filter possibly brings about color failure and deterioration by baking. Therefore, the attachment of the color filter is preferably accomplished by the baking at a lowest possible temperature.

Japanese Patent Application Laid-open No. Hei 4-100020 has disclosed an alignment film of a polyimide obtained from a diamino compound having a straight-chain alkyl ester on a side chain and 3,3',4,4'-biphenyltetracarboxylic dianhydride, and a liquid crystal display using the same. With regard to the pretilt angle of this alignment film, however, no detailed description is provided.

On the other hand, in Japanese Patent Application Laid-open Nos. Hei 3-179322, Hei 3-179323 and Hei 5-27244, there have been disclosed polyimide liquid crystal alignment films obtained from a diamine having a mesogen group on a side chain as a monomer. In these polyimides, however, baking at 230° to 450° C. for 1 to 2 hours is required for their formation. Thus, when the dye color filters having poor heat resistance are attached, there is a fear that the color failure and deterioration of the filters occur by baking.

SUMMARY OF THE INVENTION

An object of the present invention is to solve the above-mentioned problems, i.e., to provide a polyamic acid and a polyamic acid composition which can produce a polyimide by baking at a low temperature for a short period of time and which do not give rise to the color failure of a color filter or the like at the time of the formation of a liquid crystal cell.

Another object of the present invention is to provide a polyimide and a polyimide composition which have excellent liquid crystal alignment properties and which can freely form a liquid crystal alignment film having a necessary pretilt angle in a wide range.

Still another object of the present invention is to provide a liquid crystal display equipped with the liquid crystal alignment film.

The present inventors have intensively investigated a polyimide which can be obtained by reacting a diamine component having a mesogen group such as a phenylcyclohexyl group or a phenylbicyclohexyl group via a spacer comprising a flexible alkyl chain on a side chain with a tetracarboxylic dianhydride, and patent applications have already been made (Japanese Patent Application Nos. Hei 6-173269 and Hei 6-234162). As a result of further investigations, it has been found that a polyimide alignment film having excellent liquid crystal alignment properties can be formed from a polyamic acid obtained by reacting a tetracarboxylic dianhydride with two kinds of diamine components containing a diamine component which possesses a side chain having a mesogen group via a spacer comprising a flexible alkyl chain, or a polyamic acid composition comprising a polyamic acid obtained by reacting a tetracarboxylic dianhydride with a diamine component having a mesogen group on a side chain via a spacer comprising a flexible alkyl chain and a polyamic acid obtained by reacting another diamine component with a tetracarboxylic dianhydride.

That is to say, the constitutions of the present invention comprise the items described in the following paragraphs 1 to 15, respectively.

1. A polyamic acid having a logarithmic viscosity number of 0.2 to 1.0 dl/g (an N-methyl-2-pyrrolidone solvent, concentration=0.5 g/dl, 30° C.) and containing a structural unit represented by the formula [2a]

wherein m is an integer of 1 to 20; n is an integer of 1 or 2; and $R^2$ is an alkyl group or an alkoxy group having 1 to 20 carbon atoms.

2. A polyamic acid having a logarithmic viscosity number of 0.2 to 1.0 dl/g (an N-methyl-2-pyrrolidone solvent, concentration=0.5 g/dl, 30° C.) and comprising 5 mol % or more of a structural unit represented by the formula [2a] and less than 95 mol % of a structural unit represented by the formula [1a]

wherein m is an integer of 1 to 20; n is an integer of 1 or 2; $R^1$ is an alkyl group having 1 to 20 carbon atoms; and $R^2$ is an alkyl group or an alkoxy group having 1 to 20 carbon atoms.

3. A polyimide in which a logarithmic viscosity number of a polyamic acid as a precursor is in the range of 0.2 to 1.0 dl/g (an N-methyl-2-pyrrolidone solvent, concentration=0.5 g/dl, 30° C.) and which contains a structural unit represented by the formula [2]

wherein m is an integer of 1 to 20; n is an integer of 1 or 2; and $R^2$ is an alkyl group or an alkoxy group having 1 to 20 carbon atoms.

4. A polyimide in which a logarithmic viscosity number of a polyamic acid as a precursor is in the range of 0.2 to 1.0 dl/g (an N-methyl-2-pyrrolidone solvent, concentration=0.5 g/dl, 30° C.) and which comprises 5 mol % or more of a structural unit represented by the formula [2] and less than 95 mol % of a structural unit represented by the formula [1]

wherein m is an integer of 1 to 20; n is an integer of 1 or 2; $R^1$ is an alkyl group having 1 to 20 carbon atoms; and $R^2$ is an alkyl group or an alkoxy group having 1 to 20 carbon atoms.

5. The polyimide according to the above-mentioned paragraph 4 which is obtained by reacting an alkyl 3,5-diaminobenzoate represented by the formula [3], [4-(trans-4-alkyl-(di)cyclohexyl)phenoxyalkyl] 3,5-diaminobenzoate represented by the formula [4] and 3,3',4,4'-biphenyltetracarboxylic dianhydride represented by the formula [5] in a solvent, and then heating polyamic acid solution produced thereby:

wherein m is an integer of 1 to 20; n is an integer of 1 or 2; $R^1$ is an alkyl group having 1 to 20 carbon atoms; and $R^2$ is an alkyl group or an alkoxy group having 1 to 20 carbon atoms.

6. A polyamic acid composition comprising a polyamic acid containing a structural unit of the formula [A] and a polyamic acid containing a structural unit of the formula [B]

[A]

[B]

wherein m is an integer of 1 to 20; n is an integer of 1 or 2; $R^2$ is an alkyl group or an alkoxy group having 1 to 20 carbon atoms; A is a divalent organic group; B is a tetravalent organic group; and each of p and q is a value which meets a logarithmic viscosity number of the polyamic acid which is in the range of 0.2 to 1.0 dl/g (an N-methyl-2-pyrrolidone solvent, concentration=0.5 g/dl, 30° C.).

7. The polyamic acid composition according to the above-mentioned paragraph 6 in which the formula [B] is a structural unit represented by the formula [B']

[B']

wherein $R^1$ is an alkyl group having 1 to 20 carbon atoms; B is a tetravalent organic group; and q is a value which meets a logarithmic viscosity number of the polyamic acid which is in the range of 0.2 to 1.0 dl/g (an N-methyl-2-pyrrolidone solvent, concentration=0.5 g/dl, 30° C.).

8. A polyimide composition comprising a structural unit represented by the formula [S1] and a structural unit represented by the formula [S2]

[S1]

[S2]

wherein m is an integer of 1 to 20; n is an integer of 1 or 2; $R^2$ is an alkyl group or an alkoxy group having 1 to 20 carbon atoms; A is a divalent organic group; B is a tetravalent organic group; and each of α and β is a value which meets a logarithmic viscosity number of a polyamic acid as a precursor which is in the range of 0.2 to 1.0 dl/g (an N-methyl-2-pyrrolidone solvent, concentration=0.5 g/dl, 30° C.).

9. The polyimide composition according to claim 8 which is obtained by mixing a polyamic acid obtained by reacting a diamino compound represented by the formula [S3] (not containing a structural unit of the formula [4]) with a tetracarboxylic dianhydride represented by the formula [S4] in a solvent with a polyamic acid obtained by reacting a diamino compound represented by the formula [4] with a tetracarboxylic dianhydride represented by the formula [S4] in a solvent, and then heating the mixture to carry out dehydration and ring closure:

[S3]

[S4]

[4]

wherein A is a divalent organic group; B is a tetravalent organic group; m is an integer of 1 to 20; n is an integer of 1 or 2; and $R^2$ is an alkyl group or an alkoxy group having 1 to 20 carbon atoms.

10. The polyimide composition according to claim 8 wherein the formula [S1] is a structural unit represented by the formula [1'] and the formula [S2] is a structural unit represented by the formula [2']:

wherein m is an integer of 1 to 20; n is an integer of 1 or 2; $R^1$ is an alkyl group having 1 to 20 carbon atoms; $R^2$ is an alkyl group or an alkoxy group having 1 to 20 carbon atoms; and each of x and y is a value which meets a logarithmic viscosity number of a polyamic acid as a precursor which is in the range of 0.2 to 1.0 dl/g (an N-methyl-2-pyrrolidone solvent, concentration=0.5 g/dl, 30° C).

11. A liquid crystal alignment film comprising the polyimide described in the above-mentioned paragraph 3.

12. A liquid crystal alignment film comprising the polyimide composition described in the above-mentioned paragraph 8.

13. A liquid crystal display equipped with the liquid crystal alignment film described in the above-mentioned paragraph 11.

14. A liquid crystal display equipped with the liquid crystal alignment film described in the above-mentioned paragraph 12.

15. [4-(trans-4-alkyl-(di)cyclohexyl)phenoxyalkyl] 3,5-diaminobenzoate represented by the formula [4]

wherein m is an integer of 1 to 20; n is an integer of 1 or 2; and $R^2$ is an alkyl group or an alkoxy group having 1 to 20 carbon atoms.

Incidentally, the tetravalent organic group is a tetravalent group having an aromatic ring, and the divalent organic group A is a divalent group having an aromatic ring. Preferably, each of these groups has a carboxyl group or an alkylcarbonyl group on a side chain. The cyclohexylene group is a trans form.

DETAILED DESCRIPTION OF PREFERRED EMBODIMENTS

A polyamic acid of the present invention contains a repeating structural unit represented by the formula [2a].

That is to say, the polyamic acids of the present invention are a condensation polymer comprising a repeating structural unit represented by the formula [2a], and a co-condensation polymer comprising a repeating structural unit represented by the formula [2a] and a repeating structural unit represented by the formula [1a].

In the structural unit represented by the formula [2a], m is an integer of 1 to 20, preferably 3 or more, more preferably 6 or more. If m is 3 or less, the flexibility of the polymer in a side chain direction deteriorates, and thus at the time of imidation, high-temperature baking is necessary.

In the structural unit represented by the formula [1a], $R^1$ is an alkyl group having 1 to 20 carbon atoms, preferably 3 or more carbon atoms, more preferably 6 or more carbon atoms. If the number of the carbon atoms is 3 or less, the flexibility of the polymer in a side chain direction deteriorates, so that low-temperature setting properties tend to deteriorate.

The polyamic acid of the present invention can be obtained in the state of a polyamic acid solution by carrying out the condensation polymerization reaction of [4-(trans-4-alkyl-(di)cyclohexyl)phenoxyalkyl] 3,5-diaminobenzoate represented by the formula [4] and 3,3',4,4'-biphenyltetracarboxylic dianhydride (BPDA) represented by the formula [5] in a solvent, or the condensation reaction of two kinds of diamines of an alkyl 3,5-diaminobenzoate represented by the formula [3], [4-(trans-4-alkyl-(di)cyclohexyl)phenoxyalkyl] 3,5-diaminobenzoate represented by the formula [4] and 3,3',4,4'-biphenyltetracarboxylic dianhydride (BPDA) represented by the formula [5] in a solvent. The reaction is carried out under anhydrous conditions at a temperature of –10° to 30° C. in a solvent such as dimethylacetamide (DMAc), N-methyl-2-pyrrolidone (NMP), dimethylformamide (DMF), dimethyl sulfoxide (DMSF), sulfolane, butyrolactone, cresol, phenol, a halogenated phenol, cyclohexanone, dioxane or tetrahydrofuran, preferably in the NMP solvent.

A polyimide of the present invention can be obtained by coating a substrate with the above-mentioned polyamic acid solution, and then thermally treating the same at 100° to 450° C., but the present invention is characterized by imidating the polyamic acid solution at a low temperature of 100° to 200° C. for a short period of time.

A polyamic acid composition of the present invention comprises a polyamic acid containing a structural unit of the formula (A) and another polyamic acid containing a structural unit of the formula (B). In the structural unit represented by the formula (A), m is an integer of 1 to 20, preferably 3 or more, more preferably 6 or more. If m is 3 or less, the flexibility of the polymer in a side chain direction deteriorates, and thus at the time of the imidation, high-temperature baking is necessary.

The polyamic acid composition of the present invention is obtained by mixing the solution of a polyamic acid (A) obtained by reacting a diamino compound represented by the formula [4] with a tetracarboxylic dianhydride represented by the formula [S4] in a solvent with the solution of a polyamic acid (B) obtained by reacting a diamino compound represented by the formula [S3] (not containing the structural unit of the formula [4]) with a tetracarboxylic dianhydride represented by the formula [S4] in a solvent. A composition ratio of the above-mentioned two kinds of polyamic acids is preferably such that the polyamic acid (A) is 5 mol % or more and the polyamic acid (B) is less than 95 mol %.

The above-mentioned condensation reaction of the diamino compound with the tetracarboxylic dianhydride is carried out under anhydrous conditions at a temperature of −10° to 30° C. in a solvent such as DMAc, N-methyl-NMP, DMF, dimethyl sulfoxide (DMSO), sulfolane, butyrolactone, cresol, phenol, a halogenated phenol, cyclohexanone, dioxane and tetrahydrofuran, preferably in the NMP solvent.

Examples of the diamino compound represented by the formula [S3] (not containing the structural unit of the formula [4]) include the following compounds, but they are not always restrictive.

Typical examples of aromatic diamines include 4,4'-diaminodiphenyl ether, 4,4'-diaminodiphenylmethane, 4,4'-diaminodiphenylsulfone, 3,3'-diaminodiphenylsulfone, 4,4'-diaminodiphenyl sulfide, 4,4'-di(m-aminophenoxy) diphenylsulfone, 4,4'-di(p-aminophenoxy)diphenylsulfone, o-phenylenediamine, m-phenylenediamine, p-phenylenediamine, benzidine, 3,3'-diaminobenzophenone, 4,4'-diaminobenzophenone, 4,4'-diaminodiphenyl-2,2'-propane, 1,5-diaminonaphthalene, 1,8-diaminonaphthalene, 3,4'-diaminodiphenyl ether, 4,4'-bis(4-aminophenoxy)biphenyl, 2,2-bis{4-(4-aminophenoxy)phenyl}hexafluoropropane, 1,4-bis(4-aminophenoxy)benzene, 1,3-bis(4-aminophenoxy)benzene, 1,3-bis(3-aminophenoxy)benzene, 4,4'-diamino-3,3'-diethyl-5,5'-dimethyldiphenylmethane, 4,4'-diamino-3,3',5,5'-tetramethyldiphenylmethane, 1,4-diaminotoluene, m-xylenediamine, 2,2'-dimethylbenzidine and the like; and examples of alicyclic diamines include 1,4-diaminocyclohexane, isophoronediamine and the like. In addition, there are also preferably used diamines in which an aromatic ring or an alicyclic ring of each of the above-mentioned diamines has a carboxyl group or an alkylcarbonyl group as a side chain.

Examples of the tetracarboxylic dianhydride represented by the formula [S4] include the following compounds, but they are not always restrictive.

Typical examples of aromatic tetracarboxylic dianhydrides include pyromellitic dianhydride, 3,3',4,4'-biphenyltetracarboxylic dianhydride, 2,2',3,3'-biphenyltetracarboxylic dianhydride, 2,3,3',4'-biphenyltetracarboxylic dianhydride, 3,3',4,4'-benzophenonetetracarboxylic dianhydride, 2,3,3',4'-benzophenonetetracarboxylic dianhydride, 2,2',3,3'-benzophenonetetracarboxylic dianhydride, bis(3,4-dicarboxyphenyl) ether dianhydride, bis(3,4-dicarboxyphenyl)sulfone dianhydride, 1,2,5,6-naphthalenetetracarboxylic dianhydride, 2,3,6,7-naphthalenecarboxylic dianhydride, 2,2-bis(3,4-dicarboxyphenyl)tetrafluoropropane dianhydride and the like; and typical examples of alicyclic tetracarboxylic dianhydrides include cyclobutanetetracarboxylic dianhydride, methylcyclobutanetetracarboxylic dianhydride and the like.

Examples of the solvent include N-methyl-2-pyrrolidone, N,N-dimethylacetamide, N,N-dimethylformamide, dimethyl sulfoxide, tetramethyl urea, pyridine, hexamethylphosphoramide, methylformamide, N-acetyl-2-pyrrolidone, 2-methoxyethanol, 2-ethoxyethanol, 2-butoxyethanol, diethylene glycol monomethyl ether, diethylene glycol monoethyl ether, diethylene glycol monobutyl ether, cyclopentanone, cyclohexanone, cresol, γ-butyrolactone, isophorone, N,N-diethylacetamide, N,N-diethylformamide, N,N-dimethylmethoxyacetamide, tetrahydrofuran, N-acetyl-2-pyrrolidone, N-methyl-ε-caprolactam and tetrahydrothiophene dioxide {sulpholane}. Furthermore, the above-mentioned reaction can be carried out in a mixed solvent obtained by mixing two or more of the above-mentioned organic solvents. In addition, the above-mentioned preferable organic solvents, prior to use, can be diluted with another aprotic (neutral) organic solvent such as an aromatic, an alicyclic or an aliphatic hydrocarbon, its chlorinated derivative (e.g., benzene, toluene, a xylene, cyclohexane, pentane, hexane, petroleum ether or methylene chloride), or dioxane.

The alkyl 3,5-diaminobenzoate represented by the formula [3] which is one of the diamino compounds regarding the preparation of the polyamic acid and the polyamic acid composition of the present invention can be synthesized in accordance with the following procedure wherein $R^2$ is an alkyl group having 1 to 20 carbon atoms.

That is to say, an alkyl alcohol and 3,5-dinitrobenzoyl chloride are condensed in the presence of triethylamine to obtain an alkyl 3,5-dinitrobenzoate, and this compound is then subjected to catalytic reduction in the presence of a palladium-carbon catalyst, thereby synthesizing the alkyl 3,5-diaminobenzoate.

The [4-(trans-4-alkyl-(di)cyclohexyl)phenoxyalkyl] 3,5-diaminobenzoate represented by the formula [4], i.e., a diamine component having a mesogen group on a side chain which takes part in the preparation of the polyamic acid and the polyamic acid composition of the present invention can be synthesized in accordance with the following procedure wherein m is an integer of 1 to 20; n is an integer of 1 or 2; $R^2$ is an alkyl group or an alkoxy group having 1 to 20 carbon atoms; and X is a halogen.

That is to say, in the first place, a 4-(trans-4-alkyl-cyclohexyl)phenol or a 4-(trans-4-alkyl-dicyclohexyl) phenol and an α,ω-alkylenehalohydrin are condensed at 100° to 150° C. in the presence of excess potassium carbonate in a solvent such as dimethylacetamide (DMAc), N-methyl-2-pyrrolidone (NMP) or dimethylformamide (DMF) to obtain a phenoxyalkyl alcohol. In succession, this compound and 3,5-dinitrobenzoyl chloride are condensed in the presence of triethylamine, thereby obtaining [4-(trans-4-alkyl-cyclohexyl)phenoxyalkyl] 3,5-dinitrobenzoate or [4-(trans-4-alkyl-dicyclohexyl)phenoxyalkyl] 3,5-dinitrobenzoate. Finally, this compound was subjected to catalytic reduction in the presence of a palladium-carbon catalyst to synthesize [4-(trans-4-alkyl-cyclohexyl) phenoxyalkyl] 3,5-diaminobenzoate or [4-(trans-4-alkyl-dicyclohexyl)phenoxyalkyl] 3,5-diaminobenzoate.

The polyimide composition of the present invention can be obtained by baking the above-mentioned polyamic acid composition solution at about 200° C. A preferable method can be used which comprises coating a substrate with the polyamic acid composition solution, and then heating it to carry out dehydration reaction, whereby the polyimide composition is formed on the substrate. When the polyamide composition of the present invention is heated at a low temperature of 100° to 200° C. for a short time, a polyimide composition can be obtained.

A composition ratio between the polyimide containing a structural unit represented by the formula [1'] and the polyimide containing a structural unit represented by the formula [2'] in the polyimide composition of the present invention is preferably such that the former is 95 to 0 mol % and the latter is 5 to 100 mol %.

The substrate which can be used in a liquid crystal alignment film and a liquid crystal display is usually a glass substrate, and on the substrate, electrodes, concretely, transparent electrodes of ITO (indium oxide-tin oxide) or tin oxide are formed. Furthermore, in order to prevent an alkali from oozing from the substrate, an insulating film or an undercoat film such as a color filter or a color filter overcoat may be formed between the substrate and the electrodes, and on the electrodes, an insulating film or an overcoat film such as a color filter may be formed. In addition, an active element such as a TFT (thin film transistor) or an MIM (metal-insulator-metal) may be formed on the electrodes. As the electrodes, the undercoat and other members in a liquid crystal cell, there can be used members in conventional liquid crystal cell.

The formation of the polyimide, the polyimide composition of the present invention or the liquid crystal alignment film on the substrate can be accomplished in accordance with the following procedure. First, the polyamic acid or the polyamic acid composition of the present invention is dissolved in a solvent such as NMP, DMAc, DMF, DMSO, butyl cellosolve or ethyl carbitol to prepare a 0.1 to 30 wt % solution, and this solution is then applied onto the substrate by a brush application method, an immersion method, a spin coating method, a spray method or a printing method. Afterward, baking is done at 100° to 450° C., preferably 180° to 220° C. to carry out a dehydration/cyclization reaction, thereby forming the film of the polyimide or the polyimide composition. If the surface of the substrate is treated with a silane coupling agent prior to the application of the solution to form the film of the polyimide or the polyimide composition thereon, adhesive properties between the film and the substrate can be improved. Afterward, the surface of this film is rubbed in one direction with a cloth or the like to obtain the liquid crystal alignment film.

A cell is formed by the use of the substrate for a liquid crystal display, and a liquid crystal is then injected into the cell. Next, an injection opening is closed to form the liquid crystal display. As this liquid crystal to be injected, there can be used various liquid crystals such as a usual nematic liquid crystal and a liquid crystal to which a dichroic dye is added.

The liquid crystal alignment film of the present invention is excellent in liquid crystal alignment properties, and so a pretilt angle can be optionally selected in a wide range of 5° to 45° by suitably selecting a ratio of components of the polyamic acid or the polyamic acid composition of the present invention.

The liquid crystal display of the present invention is characterized by being equipped with the liquid crystal alignment film which is excellent in liquid crystal alignment properties and in which the pretilt angle can be optionally controlled in a wide range of 5° to 45°, i.e., the liquid crystal alignment film regarding the present invention. In general, the liquid crystal display is constituted of the substrate, a voltage application means, the liquid crystal alignment film, a liquid crystal layer and the like.

The polyimide or the polyimide composition of the present invention can be prepared by baking the polyamic acid or the polyamic acid composition of the present invention at a low temperature for a short period of time, and the decomposition temperature of the polyimide is 350° C. or more and that of the polyimide composition is 320° C. or more, which means that the polyimide or the polyimide composition of the present invention can be used at high temperatures. Furthermore, this polyimide or polyimide composition is excellent in adhesive properties to the glass substrate and liquid crystal alignment properties. In addition, the pretilt angle of the liquid crystal alignment film can be optionally controlled in a wide range of about 5° to 45° by suitably changing a ratio of copolymerization and a ratio of components in the composition, and therefore the polyimide or the polyimide composition of the present invention are useful as materials for the alignment films of liquid crystal cells of TN, STN and SBE.

EXAMPLES

Next, the present invention will be described in more detail with reference to examples, but the scope of the present invention should not be limited to these examples at all.

Physical properties in the examples were measured in the following manner.

Decomposition temperature (Td): Measurement was made at a temperature rise velocity of 10° C. per minute by the use of a differential thermal weight simultaneous measuring device (TG/DTA-220 type, made by Seiko Electronic Industry Co., Ltd.), and a temperature at which weight reduction had reached 5% was regarded as Td.

Logarithmic viscosity number: This was measured at 30° C. at a concentration of 0.5 g/dl in an NMP solvent by the use of a Ubbelohde's viscometer.

Pretilt angle: This was measured by the use of a magnetic field electrostatic capacity method.

Example 1

(1) Preparation of stearyl 3,5-diaminobenzoate (in the formula [3], $R^1=C_{18}H_{37}$):

(a) Preparation of stearyl 3,5-dinitrobenzoate:

In a 500-ml three-necked flask equipped with a stirrer was placed 200 ml of tetrahydrofuran (THF), and 13.5 g (0.050 mol) of stearyl alcohol and 8.4 ml of triethylamine were added thereto, followed by stirring at 0° C. Afterward, a solution obtained by dissolving 11.5 g (0.050 mol) of 3,5-dinitrobenzoyl chloride in 50 ml of THF was added dropwise to the flask over 30 minutes, and under this state, reaction was carried out for 6 hours. After the completion of the reaction, this solution was poured into 1 liter of water, and extraction was then made with 1.5 liters of ethyl acetate. In succession, the resultant organic layer was washed with 3N hydrochloric acid three times, a saturated sodium bicarbonate solution three times and water. The resultant ethyl acetate layer was dried over anhydrous sodium sulfate, and the solvent was then distilled off under reduced pressure. Next, the resultant crystal was recrystallized from ethyl acetate twice to obtain 18.1 g (0.039 mol) of stearyl 3,5-dinitrobenzoate. Its melting point was in the range of 75.9° to 76.7° C. The structure of this compound was confirmed by an infrared absorption spectrum (IR) and NMR.

(b) Preparation of stearyl 3,5-diaminobenzoate:

In 300 ml of ethyl acetate was dissolved 8.0 g (0.017 mol) of stearyl 3,5-dinitrobenzoate, and 1.0 g of 5% palladium-carbon was then added thereto and catalytic reduction was carried out at ordinary temperature under atmospheric pressure. After the completion of the reaction, the catalyst was removed by filtration and the solvent was distilled off under reduced pressure to obtain a crystal. The thus obtained crystal was recrystallized from n-heptane/ethyl acetate twice to obtain 4.48 g (0.011 mol) of stearyl 3,5-diaminobenzoate. The melting point of this compound was in the range of 81.8° to 82.6° C.

(2) Preparation of [4-(trans-4-ethyl-cyclohexyl) phenoxypropyl] 3,5-diaminobenzoate (however, in the formula [4], m=3, n=1 and $R^2=C_2H_5$):

(a) Preparation of 4-(trans-4-ethyl-cyclohexyl) phenoxypropanol:

In a 1-liter three-necked flask equipped with a condenser and a stirrer were placed 500 ml of dimethylformamide, 20.4 g (0.10 mol) of 4-(trans-4-ethyl-cyclohexyl)phenol and 41.4 g (0.30 mol) of potassium carbonate, followed by stirring at room temperature. Afterward, 18.1 g (0.13 mol) of 3-bromo-1-propanol was added thereto, and the solution was then vigorously stirred at 100° C. After reaction for 10 hours, this solution was poured into 2 liters of water, and extraction was then made with 1.5 liters of ethyl acetate. In succession, the resultant organic layer was washed with 3N hydrochloric acid three times, a 2N aqueous sodium hydroxide solution three times and water. The resultant ethyl acetate layer was dried over anhydrous sodium sulfate, and the solvent was then distilled off under reduced pressure. Next, the resultant crystal was recrystallized from n-heptane twice to obtain 17.6 g (0.067 mol) of 4-(trans-4-ethyl-cyclohexyl) phenoxypropanol. Its melting point was in the range of 68.5° to 69.9° C.

(b) Preparation of [4-(trans-4-ethyl-cyclohexyl) phenoxypropyl] 3,5-dinitrobenzoate:

In a 500-ml three-necked flask equipped with a stirrer was placed 300 ml of THF, and 18.0 g (0.068 mol) of 4-(trans-4-ethyl-cyclohexyl)phenoxypropanol obtained in the above-mentioned manner and 11.4 ml of triethylamine were added, followed by stirring at 0° C. Afterward, a solution obtained by dissolving 15.7 g (0.068 mol) of 3,5-dinitrobenzoyl chloride in 50 ml of THF was added dropwise to the flask over 30 minutes, and under this state, reaction was carried out for 6 hours. After the completion of the reaction, this solution was poured into 1 liter of water, and extraction was then made with 1.5 liters of ethyl acetate. In succession, the resultant organic layer was washed with 3N hydrochloric acid three times, a saturated sodium bicarbonate solution three times and water. The resultant ethyl acetate layer was dried over anhydrous sodium sulfate, and the solvent was then distilled off under reduced pressure. Next, the resultant crystal was recrystallized from ethyl acetate twice to obtain 23.3 g (0.051 mol) of [4-(trans-4-ethyl-cyclohexyl) phenoxypropyl] 3,5-dinitrobenzoate. Its melting point was in the range of 108.0° to 109.4° C. The structure of this compound was confirmed by IR and NMR.

(c) Preparation of [4-(trans-4-ethyl-cyclohexyl) phenoxypropyl] 3,5-diaminobenzoate:

In 300 ml of ethyl acetate was dissolved 15.0 g (0.033 mol) of [4-(trans-4-ethyl-cyclohexyl)phenoxypropyl] 3,5-dinitrobenzoate, and 1.50 g of 5% palladium-carbon was then added thereto and catalytic reduction was carried out at ordinary temperature under atmospheric pressure. After the completion of the reaction, the catalyst was removed by filtration and the solvent was distilled off under reduced pressure to obtain a crystal. The thus obtained crystal was recrystallized from n-heptane/ethyl acetate twice to obtain 11.1 g (0.028 mol) of [4-(trans-4-ethyl-cyclohexyl) phenoxypropyl] 3,5-diaminobenzoate. The melting point of this compound was in the range of 91.5° to 92.4° C.

(3) Preparation of polyamic acid:

In a 50-ml three-necked flask were placed 0.0606 g (0.15 mmol) of stearyl 3,5-diaminobenzoate, 0.5348 g (1.35 mmol) of [4-(trans-4-ethyl-cyclohexyl)phenoxypropyl] 3,5-diaminobenzoate and 3.0 ml of N-methyl-2-pyrrolidone (NMP), and the mixture was stirred at room temperature under a nitrogen stream to dissolve them. Next, this solution was maintained at 10° C., and 0.4413 g (1.50 mmol) of 3,3',4,4'-biphenyltetracarboxylic dianhydride (BPDA) was then added thereto. Afterward, BPDA which adhered on the wall of the flask was washed off with 3 ml of NMP, and under this state, reaction was carried out for 3 hours to obtain a polyamic acid solution.

A part of this solution was poured into methanol, and the deposited precipitate was then collected by filtration. Next, the collected precipitate was dried at ordinary temperature under reduced pressure to obtain a polyamic acid. The inherent viscosity (logarithmic viscosity number) of this polyamic acid was 0.51 dl/g (30° C., 0.5 g/dl, an NMP solution).

(4) Polyimide and alignment film:

The polyamic acid solution obtained in the paragraph (3) was diluted to 4.0 wt % with an NMP/butyl cellosolve (1/1) solvent, and the dilute solution was then applied to a glass substrate equipped with transparent electrodes of ITO by a spin coating method (a spinner method). After the application, the applied substrate was baked at 200° C. for 30 minutes to obtain the substrate provided with a polyimide film having a thickness of 600 Å. This polyimide had a decomposition temperature of 360.3° C. and good adhesive properties to the substrate.

Figure 1:
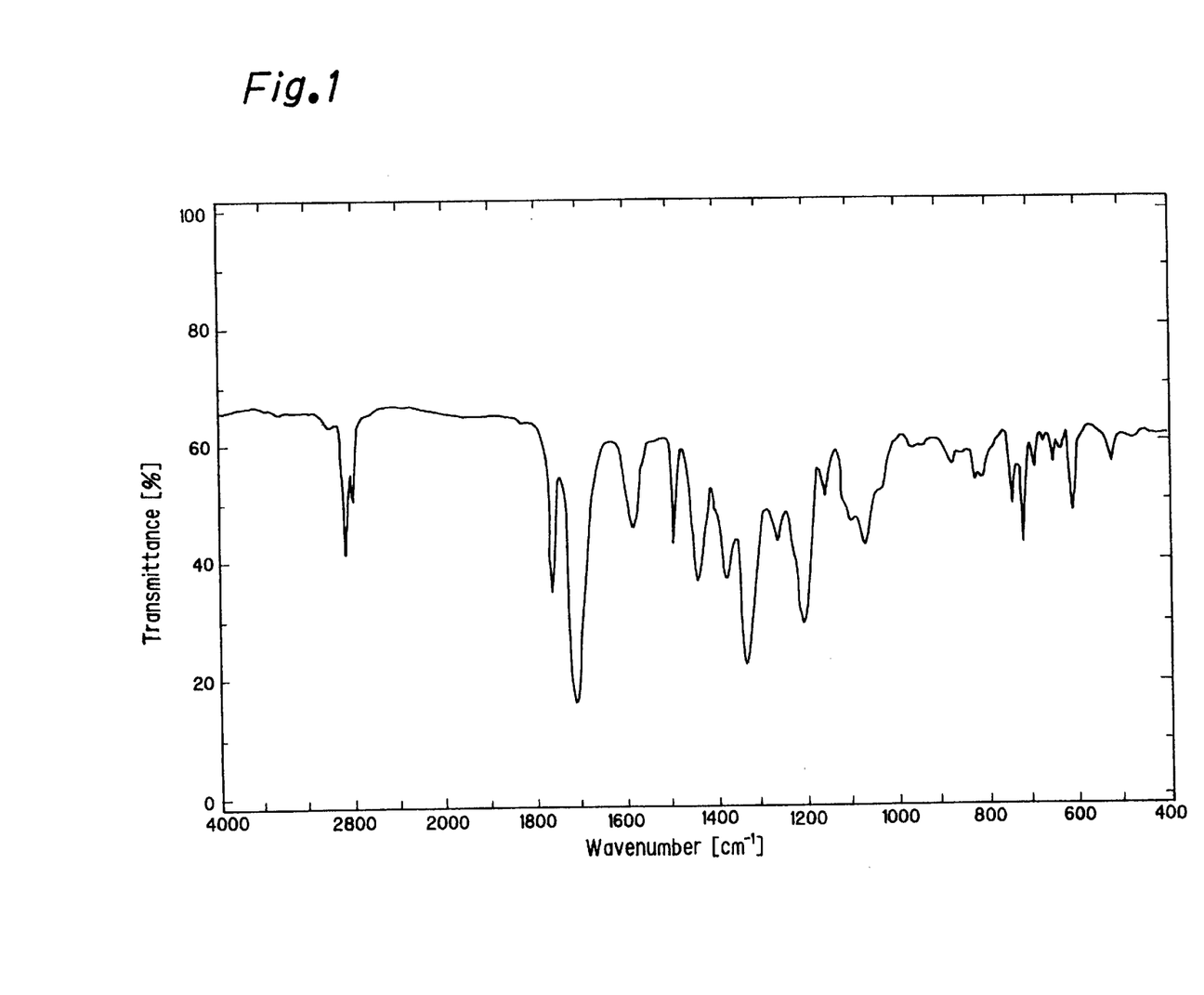
FIG. 1 shows an IR spectrum of a polyimide obtained in Example 1.

Moreover, a part of the polyamic acid solution obtained in the paragraph (3) was diluted with NMP, applied to a glass substrate, and then heated at 200° C. for 30 minutes to obtain a film. The infrared absorption spectrum (IR) of the obtained film is shown in FIG. 1.

(5) Preparation of cell and measurement of pretilt angle:

The surfaces of two substrates on which polyimide films were formed were subjected to a rubbing treatment, thereby forming liquid crystal alignment films. Next, a liquid crystal cell having a cell thickness of 20 μm was constructed so that the rubbing directions of the liquid crystal alignment films might be antiparallel to each other, and a liquid crystal ("FB-01", made by Chisso Corp.) was injected into the cell and it was then sealed. Afterward, the cell containing the liquid crystal was subjected to a heat treatment at 120° C. for 30 minutes. After the heat treatment, the cell was allowed to stand, and at this time, a measured pretilt angle was 29.2°. According to the observation of the cell by a microscope, an alignment state was not disordered, and the cell exhibited an excellent alignment performance.

Examples 2 to 5

The same procedures as in paragraphs (3), (4) and (5) of Example 1 were repeated except that each component ratio of stearyl 3,5-diaminobenzoate and [4-(trans-4-ethyl-cyclohexyl)phenoxypropyl] 3,5-diaminobenzoate was changed. The component ratios and the values of measured physical properties are shown in Table 1.

TABLE 1

| Example | Formula [3] $R^1$ | Formula [4] m | n | $R^2$ | Copolymerization Ratio (molar ratio) Formula [1a] | Formula [2a] |
|---|---|---|---|---|---|---|
| 1 | $C_{18}H_{37}$ | 3 | 1 | $C_2H_5$ | 0.1 | 0.9 |
| 2 | $C_{18}H_{37}$ | 3 | 1 | $C_2H_5$ | 0.3 | 0.7 |
| 3 | $C_{18}H_{37}$ | 3 | 1 | $C_2H_5$ | 0.5 | 0.5 |
| 4 | $C_{18}H_{37}$ | 3 | 1 | $C_2H_5$ | 0.7 | 0.3 |
| 5 | $C_{18}H_{37}$ | 3 | 1 | $C_2H_5$ | 0.9 | 0.1 |

| Example | Polyamic Acid Logarithmic Viscosity Number[1] | Polyimide Decomposition Temp.[2] | Alignment Film Pretilt Angle |
|---|---|---|---|
| 1 | 0.51 | 360.3 | 29.2° |
| 2 | 0.39 | 358.2 | 38.1° |
| 3 | 0.73 | 372.9 | 43.0° |
| 4 | 0.55 | 349.9 | 22.6° |
| 5 | 0.49 | 370.8 | 8.10° |

[1] The logarithmic viscosity number was measured at 30° C. and 0.5 g/dl in NMP.
[2] Measurement was made at a temperature rise velocity of 15° C./min, and a temperture at which weight reduction was 5% was regarded as the decomposition temperature.

Example 6

(1) Preparation of polyamic acid (A) (in the formula [2'], m=3, n=1 and $R^2=C_2H_5$):

In a 50-ml three-necked flask were placed 0.5942 g (1.50 mmol) of [4-(trans-4-ethyl-cyclohexyl)phenoxypropyl] 3,5-diaminobenzoate and 3.0 ml of an NMP solvent, and the mixture was stirred at room temperature under a nitrogen stream to dissolve it. Next, this solution was maintained at 10° C., and 0.4413 g (1.50 mmol) of BPDA was added thereto. Afterward, BPDA which adhered on the wall of the flask was washed off with 3 ml of NMP, and reaction was then carried out for 3 hours.

(2) Preparation of polyamic acid (B) (in the formula [1'], $R^1$=H):

In a 50-ml three-necked flask were placed 0.6061 g (1.50 mmol) of 1,3-phenylenediamine and 3.0 ml of N-methyl-2-pyrrolidone (NMP), and the mixture was stirred at room temperature under a nitrogen stream to dissolve it. Next, this solution was maintained at 10° C., and 0.4413 g (1.50 mmol) of 3,3',4,4'-biphenyltetracarboxylic dianhydride (BPDA) was added thereto. Afterward, BPDA which adhered on the wall of the flask was washed off with 3 ml of NMP, and reaction was then carried out for 3 hours to obtain a polyamic acid solution.

(3) Preparation of polyamic acid composition:

With 1.00 g of the polyamic acid solution prepared in the above-mentioned (1) were mixed 0.50 g of the polyamic acid solution prepared in the above-mentioned (2), and the mixture was stirred, until a uniform state was attained, to obtain a polyamic acid composition solution.

(4) Liquid crystal alignment film comprising polyimide composition:

The polyamic acid composition solution obtained in the above-mentioned paragraph (3) was diluted to 4.0 wt % with an NMP/butyl cellosolve (1/1) solvent, and the dilute solution was then applied to a glass substrate equipped with transparent electrodes of ITO by a spin coating method (a spinner method). The applied substrate was baked at 200° C. for 30 minutes to obtain the substrate provided with a polyimide composition film having a thickness of 600 Å. This polyimide composition had a decomposition temperature of 391.4° C. and good adhesive properties to the substrate.

The surfaces of the two substrates on which the polyimide compositions were formed were subjected to a rubbing treatment, thereby forming liquid crystal alignment films.

Next, a liquid crystal cell having a cell thickness of 20 $\mu$m was constructed so that the rubbing directions of the liquid crystal alignment films might be antiparallel to each other, and a liquid crystal (FB-01, made by Chisso Corp.) was injected into the cell and it was then sealed. Afterward, the cell containing the liquid crystal was subjected to a heat treatment at 120° C. for 30 minutes. After the heat treatment, the cell was allowed to stand, and at this time, a measured pretilt angle was 16.7°. According to the observation of the cell by a microscope, an alignment state was not disordered, and the cell exhibited an excellent alignment performance.

Example 7

(1) Preparation of polyamic acid (A):

A polyamic acid was prepared in accordance with the procedure of paragraph (1) of Example 6.

(2) Preparation of polyamic acid (B) (in the formula [1'], $R^1=C_{18}H_{37}$):

In a 50-ml three-necked flask were placed 0.6061 g (1.50 mmol) of stearyl 3,5-diaminobenzoate and 3.0 ml of an NMP solvent, and the mixture was stirred at room temperature under a nitrogen stream to dissolve it. Next, this solution was maintained at 10° C., and 0.4413 g (1.50 mmol) of BPDA was added thereto. Afterward, BPDA which adhered on the wall of the flask was washed off with 3 ml of NMP, and reaction was then carried out for 3 hours.

(3) Preparation of polyamic acid composition:

With 1.00 g of the polyamic acid solution prepared in the above-mentioned (1) were mixed 0.11 g of the polyamic acid solution prepared in the above-mentioned (2) to obtain a polyamic acid composition solution.

(4) Liquid crystal alignment film comprising polyimide composition:

A liquid crystal alignment film was made in accordance with Example 6. The results are shown in Table 2.

Examples 8 to 11

The same procedure as in Example 6 was repeated except that a ratio of a polyamic acid solution to another polyamic acid solution was changed. The results are shown in Table 2.

Figure 2:
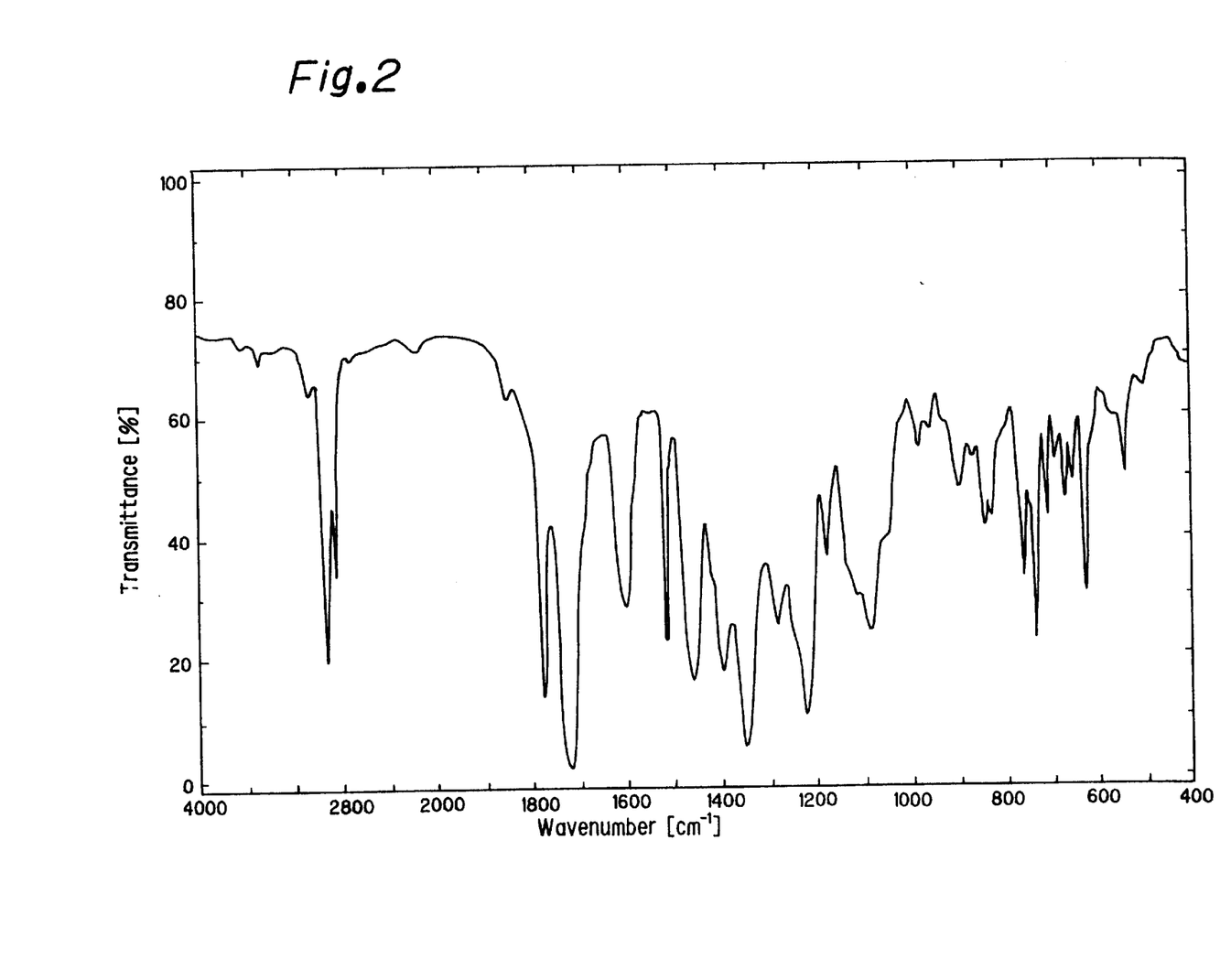
FIG. 2 shows an IR spectrum of a polyimide composition obtained in Example 8.

A part of the polyamic acid solution obtained in Example 8 was diluted with NMP, applied to a glass substrate, and then heated at 200° C. for 30 minutes to obtain a film. The IR of this film is shown in FIG. 2.

TABLE 2

| Example | Polyamic Acid B Formula [1'] $R^1$ | Polyamic Acid A Formula [2'] m | n | $R^2$ |
|---|---|---|---|---|
| 6 | H | 3 | 1 | $C_2H_5$ |
| 7 | $C_{18}H_{37}$ | 3 | 1 | $C_2H_5$ |
| 8 | $C_{18}H_{37}$ | 3 | 1 | $C_2H_5$ |
| 9 | $C_{18}H_{37}$ | 3 | 1 | $C_2H_5$ |
| 10 | $C_{18}H_{37}$ | 3 | 1 | $C_2H_5$ |
| 11 | $C_{18}H_{37}$ | 3 | 1 | $C_2H_5$ |

| Example | Composition Composition Ratio (molar ratio) Formula [1'] | Formula [2'] | Polyimide Decomposition Temperature[1] | Alignment Film Pretilt Angle |
|---|---|---|---|---|
| 6 | 0.5 | 0.5 | 391.4 | 16.7 |
| 7 | 0.1 | 0.9 | 319.4 | 5.21 |

TABLE 2-continued

| 8 | 0.3 | 0.7 | 339.3 | 7.25 |
|---|---|---|---|---|
| 9 | 0.5 | 0.5 | 335.1 | 13.3 |
| 10 | 0.7 | 0.3 | 363.4 | 18.2 |
| 11 | 0.9 | 0.1 | 373.5 | 20.4 |

[1)]Measurement was made at a temperature rise velocity of 10° C./min, and a temperture at which weight reduction was 5% was regarded as the decomposition temperature.

Example 12

(1) Preparation of polyamic acid (A) (in the formula [2'], m=6, n=1 and $R^2=C_3H_7$):

In a 100-ml three-necked flask were placed 0.6723 g (1.50 mmol) of [4-(trans-4-propyl-cyclohexyl)phenoxyhexyl] 3,5-diaminobenzoate obtained in the same manner as in the paragraph (2) of Example 1 and 3.0 ml of an NMP solvent, and the mixture was stirred at room temperature under a nitrogen stream to dissolve it. Next, this solution was maintained at 10° C., and 0.4413 g (1.50 mmol) of BPDA was added thereto. Afterward, BPDA which adhered on the wall of the flask was washed off with 3 ml of NMP, and reaction was then carried out for 3 hours to obtain a polyamic acid solution.

A part of this solution was poured into methanol, and the deposited precipitate was then collected by filtration. Next, the collected precipitate was dried at ordinary temperature under reduced pressure to obtain a polyamic acid. The inherent viscosity (logarithmic viscosity number) of this polyamic acid was 0.44 dl/g (30° C., 0.5 g/dl, an NMP solution).

(2) Polyimide:

The polyamic acid solution obtained in the above-mentioned paragraph (1) was diluted to 4.0 wt % with an NMP/butyl cellosolve (1/1) solvent, and the dilute solution was then applied to a glass substrate equipped with ITO by a spin coating method (a spinner method). The applied substrate was baked at 200° C. for 30 minutes to obtain the a polyimide film. This polyimide film had a decomposition temperature of 377.1° C.

Figure 3:
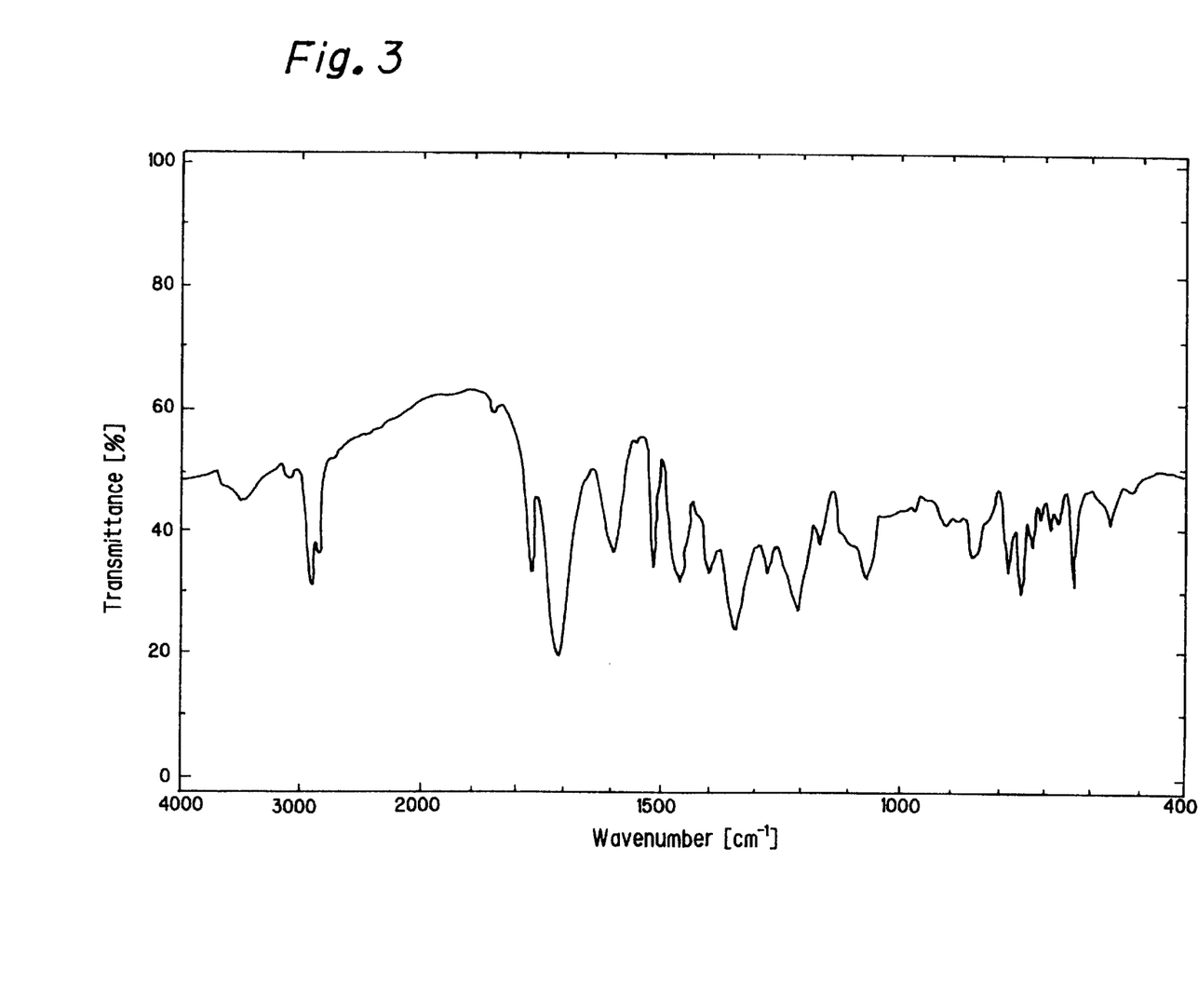
FIG. 3 shows an IR spectrum of a polyimide obtained in Example 12.

The IR of the obtained polyimide film is shown in FIG. 3.

We claim:

1. A polyamic acid having a logarithmic viscosity number of 0.2 to 1.0 dl/g (in N-methyl-2-pyrrolidone solvent, concentration=0.5 g/dl, 30° C.) and containing a structural unit represented by the formula [2a]

wherein m is an integer of 1 or 20; n is an integer of 1 to 2; and $R^2$ is an alkyl group or an alkoxy group having 1 to 20 carbon atoms.

2. A polyamic acid having a logarithmic viscosity number of 0.2 to 1.0 dl/g (in N-methyl-2-pyrrolidone solvent, concentration=0.5 g/dl, 30° C.) and comprising 5 mol % or more of a structural unit represented by the formula [2a] and less than 95 mol % of a structural unit represented by the formula [1a]

wherein m is an integer of 1 or 20; n is an integer of 1 to 2; $R^1$ is an alkyl group having 1 to 20 carbon atoms; and $R^2$ is an alkyl group or an alkoxy group having 1 to 20 carbon atoms.

3. A polyimide in which a logarithmic viscosity number of a polyamic acid as a precursor is in the range of 0.2 to 1.0 dl/g (in N-methyl-2-pyrrolidone solvent, concentration=0.5 g/dl, 30° C.) and which contains a structural unit represented by the formula [2]

wherein m is an integer of 1 to 20; n is an integer of 1 to 2; and $R^2$ is an alkyl group or an alkoxy group having 1 or 20 carbon atoms.

4. A polyimide in which a logarithmic viscosity number of a polyamic acid as a precursor is in the range of 0.2 to 1.0 dl/g (in N-methyl-2-pyrrolidone solvent, concentration=0.5 g/dl, 30° C.) and which comprises 5 mol % or more of a structural unit represented by the formula [2] and less than 95 mol % of a structural unit represented by the formula [1]

-continued wherein m is an integer of 1 to 20; n is an integer of 1 to 2; $R^1$ is an alkyl group having 1 to 20 carbon atoms; and $R^2$ is an alkyl group or an alkoxy group having 1 to 20 carbon atoms.

5. The polyimide according to claim 4 which is obtained by reacting an alkyl 3,5-diaminobenzoate represented by the formula [3], [4-(trans-4-alkyl-(di)cyclohexyl)phenoxyalkyl] 3,5-diaminobenzoate represented by the formula [4] and 3,3',4,4'-biphenyltetracarboxylic dianhydride represented by the formula [5] in a solvent, and then heating a produced polyamic acid solution:

wherein m is an integer of 1 to 20; n is an integer of 1 to 2; $R^1$ is an alkyl group having 1 to 20 carbon atoms; and $R^2$ is an alkyl group or an alkoxy group having 1 to 20 carbon atoms.

6. A polyamic acid composition comprising a polyamic acid containing a structural unit of the formula [A] and a polyamic acid containing a structural unit of the formula [B]

-continued wherein m is an integer of 1 to 20; n is an integer of 1 to 2; $R^2$ is an alkyl group or an alkoxy group having 1 to 20 carbon atoms; A is a divalent organic group; B is a tetravalent organic group; and each of p and q is a value which meets a logarithmic viscosity number of the polyamic acid which is in the range of 0.2 to 1.0 dl/g (in N-methyl-2-pyrrolidone solvent, concentration=0.5 g/dl, 30° C.).

7. The polyamic acid composition according to claim 6 in which the formula [B] is a structural unit represented by the formula [B']

wherein $R^1$ is an alkyl group having 1 to 20 carbon atoms; B is a tetravalent organic group; and q is a value which meets a logarithmic viscosity number of the polyamic acid which is in the range of 0.2 to 1.0 dl/g (in N-methyl-2-pyrrolidone solvent, concentration=0.5 g/dl, 30° C.).

8. A polyimide composition comprising a structural unit represented by the formula [S1] and a structural unit represented by the formula [S2]

wherein m is an integer of 1 or 20; n is an integer of 1 to 2; $R^2$ is an alkyl group or an alkoxy group having 1 to 20 carbon atoms; A is a divalent organic group; B is a tetravalent organic group; and each of α and β is a value which meets a logarithmic viscosity number of a polyamic acid as a precursor which is in the range of 0.2 to 1.0 dl/g (in N-methyl-2-pyrrolidone solvent, concentration=0.5 g/dl, 30° C.).

9. The polyimide composition according to claim 8 which is obtained by mixing a polyamic acid obtained by reacting a diamino compound represented by the formula [S3] (free of a structural unit of the formula [4]) with a tetracarboxylic dianhydride represented by the formula [S4] in a solvent with a polyamic acid obtained by reacting a diamino compound represented by the formula [4] with a tetracarboxylic dianhydride represented by the formula [S4] in a solvent, and then heating the mixture to carry out dehydration and ring closure:

wherein A is a divalent organic group; B is a tetravalent organic group; m is an integer of 1 to 20; n is an integer of 1 or 2; and $R^2$ is an alkyl group or an alkoxy group having 1 to 20 carbon atoms.

10. The polyimide composition according to claim 8 wherein the formula [S1] is a structural unit represented by the formula [1'] and the formula [S2] is a structural unit represented by the formula [2']:

wherein m is an integer of 1 to 20; n is an integer of 1 to 2; $R^1$ is an alkyl group having 1 or 20 carbon atoms; $R^2$ is an alkyl group or an alkoxy group having 1 to 20 carbon atoms; and each of x and y is a value which meets a logarithmic viscosity number of a polyamic acid as a precursor which is in the range of 0.2 to 1.0 dl/g (in N-methyl-2-pyrrolidone solvent, concentration=0.5 g/dl, 30° C.).

* * * * *

UNITED STATES PATENT AND TRADEMARK OFFICE
CERTIFICATE OF CORRECTION

PATENT NO. : 5,830,976
DATED : November 3, 1998
INVENTOR(S) : Sugimori et al.

Page 1 of 2

It is certified that error appears in the above-identified patent and that said Letters Patent is hereby corrected as shown below:

```
Column 17, Line 60, change "or" to --to--;

Line 60, change "to" to --or--;

Column 18, Line 22, change "or" to --to--;

Line 22, change "to" to --or--;

Line 47, change "to" (2nd occurrence)
              to --or--;

Line 48, change "or" (2nd occurrence)
              to --to--;
```

UNITED STATES PATENT AND TRADEMARK OFFICE
CERTIFICATE OF CORRECTION

PATENT NO.  : 5,830,976
DATED       : November 3, 1998
INVENTOR(S) : Sugimori et al.

It is certified that error appears in the above-identified patent and that said Letters Patent is hereby corrected as shown below:

Column 20, Line 64, change "or" to --to--;

Line 64, change "to" to --or--;

Column 22, Line 27, change "or" to --to--.
Line 26, change "to" (2nd Occurence) to --or--.

Signed and Sealed this

Eighteenth Day of May, 1999

Attest:

Q. TODD DICKINSON

*Attesting Officer*     Acting Commissioner of Patents and Trademarks